UNITED STATES PATENT OFFICE.

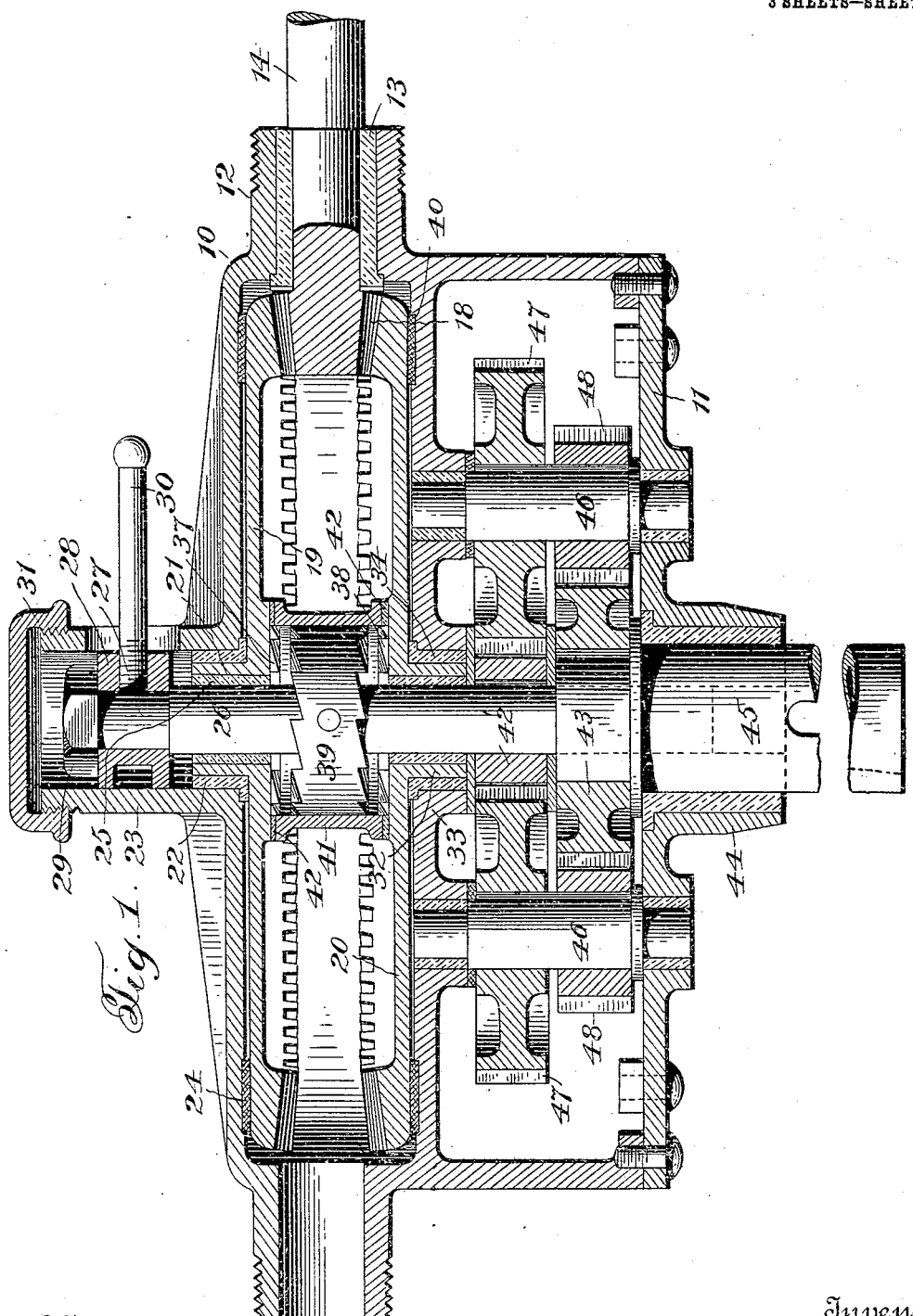

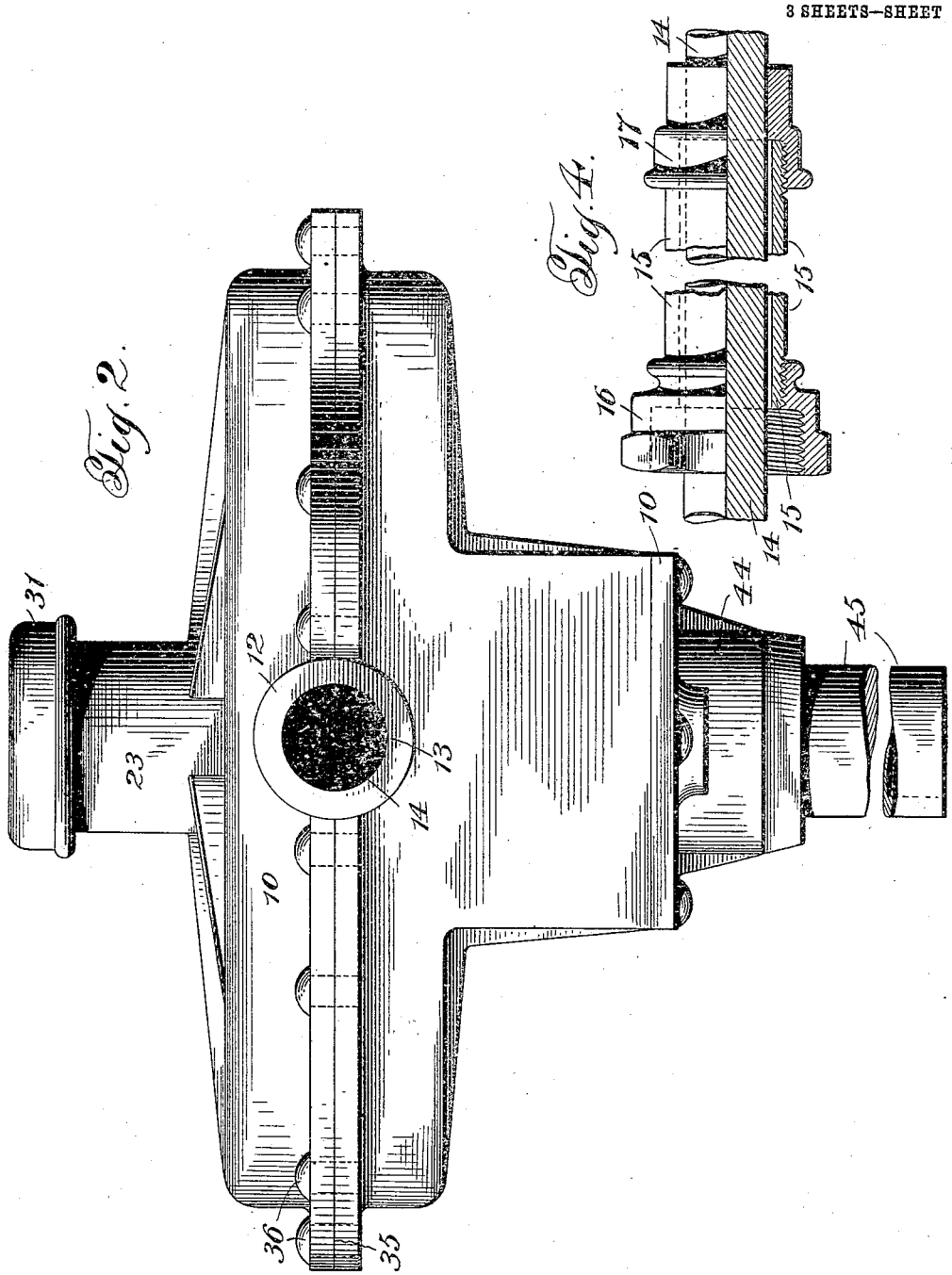

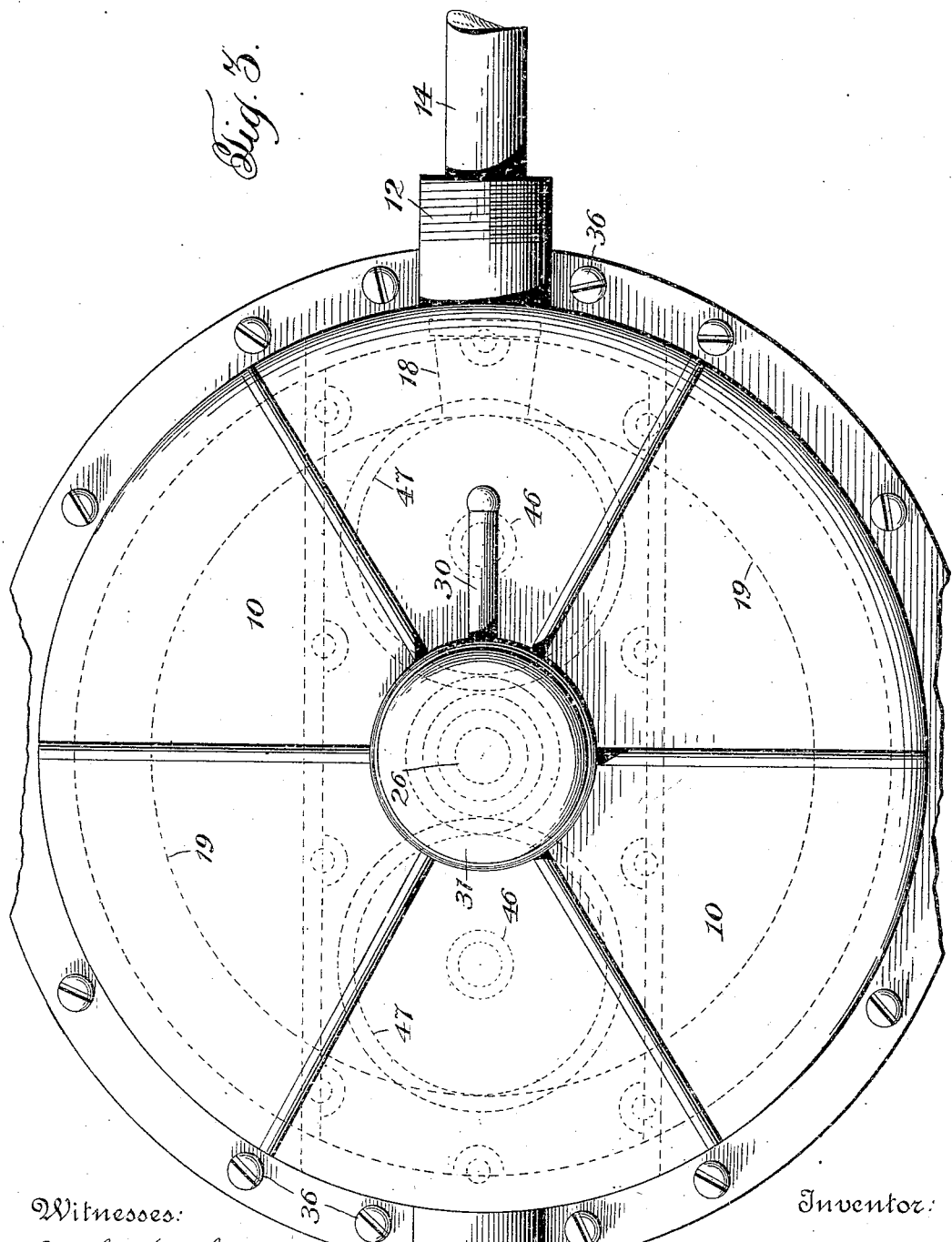

HENRY W. JACOBS, OF TOPEKA, KANSAS.

TOOL-DRIVING MECHANISM.

959,863.   Specification of Letters Patent.   Patented May 31, 1910.

Application filed May 9, 1908, Serial No. 431,994. Renewed April 6, 1910. Serial No. 553,843.

*To all whom it may concern:*

Be it known that I, HENRY W. JACOBS, of Topeka, in the county of Shawnee and State of Kansas, have invented a certain new and useful Improvement in Tool-Driving Mechanism, and do hereby declare that the following is a full and exact description thereof.

The object of my invention has been to provide a portable reduction gearing, which, while especially adapted for driving screw railroad spikes, shall also be adapted for other purposes, and which shall have among others the following advantages: that of being compact and strong; that of permitting great variations in speed; that of being readily stopped and started. And to such ends my invention consists in the portable reduction gearing hereinafter specified.

In the accompanying drawings: Figure 1 is a vertical sectional view of a reduction gearing embodying my invention; Figs. 2 and 3 are respectively a side elevation and a plan view of Fig. 1; and Fig. 4 is a detail of the shaft and inclosing pipe.

While my invention is capable of embodiment in many different forms, I have chosen to illustrate it in the embodiment shown in the drawings. In such embodiment, I provide a case, consisting of a body 10 and a cover 11. The body is preferably cylindrical in shape. At right angles to the axis of the body and upon one side is a cylindrical boss 12, which preferably has a brass bushing 13 in which is mounted a shaft 14 driven from any suitable motor. The shaft is preferably inclosed in a pipe 15, which is secured against the boss by a coupling 16. A stuffing-box 17 on the opposite end of the pipe makes a tight joint with the shaft. The pipe 15 is a convenient handle. On the end of the shaft within the casing is a bevel pinion 18 meshing with upper and lower bevel gears 19 and 20 respectively. The gear 19 has a hub 21 which has bearing preferably in a bushing 22 seated in a central cylindrical boss 23 formed on the top of the casing. A fiber washer 24 is preferably seated in an annular groove in the casing, and is of such diameter as to receive the bearing of the gear 19 near its periphery. Within the hub 21 is preferably a brass bushing 25 in which is mounted a shaft 26 having a neck 27 that bears in a collar 28 slidably mounted in the boss 23, the shaft having a nut 29 on the opposite side of the collar so that the shaft is compelled to move with the collar. A handle 30 is secured to the collar and projects through a slot in the boss so that the collar can be shifted. A cap 31 is secured on the upper end of the boss. The gear 20 also has a hub (32,) which hub has a bearing in a web 33 extending across the casing, there preferably being a bushing 34 seated in the web to form a bearing for the said hub. The casing is divided along a line 35 to permit the gears 19 and 20 and other parts to be put within it and is then fastened together as by screws 36.

The shaft 26 passes through the hub 32, and there is preferably a bushing within said hub to form a bearing for the shaft. On the under face of the gear 19 is formed an annular series of teeth 37, and on the upper face of the gear 20 is formed a corresponding series of teeth 38, said teeth forming clutch members which coöperate with a member 39, pinned or otherwise fastened to the shaft 26, and having complemental sets of teeth. The gear 19 preferably bears against a fiber washer 40 mounted in an annular groove in the web 33 similarly to the washer 24. In order to hold the gears 19 and 20 to their seats, a collar 41 surrounds the cylindrical body of the clutch member 39, and preferably carries on its upper and lower faces fiber or other anti-friction washers 42 which bear against the faces of said gears and hold them to their seats.

Between the web 33 and the cap 11 are smaller and larger pinions 42 and 43, respectively, through which passes the shaft 26, the shaft having a key which slidably engages a groove in the said pinion 42 so that the shaft may be shifted up and down through the said pinion. On the cover 11 is a boss 44 in which is mounted a spindle 45, the spindle preferably having a hole in it which receives the shaft 26. The spindle has a tapered socket or other device at its lower end for engagement with the part to be driven, such as a tool for driving screw railroad spikes. The boss 44 preferably has a bushing in which the spindle 45 bears. The pinion 42 is, as stated, splined on the shaft 26. The pinion 43 is keyed on the upper end of the spindle 45. One or more shafts 46 have bearings in the web 33 and the cap 11, the said shafts being parallel with the shaft 26. Each shaft 46 has keyed upon it a gear 47 meshing with the pinion 42, and a pinion 48 meshing with the pinion 43. When, therefore, the shaft 26 is rotated, it drives the pinion 42, and this in turn drives the gear 47, causing the shaft 46 to rotate and carry with it the pinion 48, and the latter meshing with the pinion 43 rotates the spindle 45. As the pinion 42 is smaller than the gear 47, and as the pinion 48 is smaller than the pinion 43, a double reduction in speed takes place. I prefer to have such reduction of such proportion that the spindle 14 can make about four hundred and thirty-two (432) revolutions per minute, and yet the spindle 45 make only twelve (12) revolutions per minute; but, of course, variations in speed can be made within wide limits to suit special cases.

In the operation of the illustrated embodiment of my invention, the shaft 14 being in rotation, causes the bevel gears to rotate in opposite directions. If the handle 30 be in mid-position, the clutch member 39 will not be in engagement with either of the complemental clutch members and the tool will not be revolved. If the handle 30 be moved upward, the clutch member 39 will engage with the upper clutch member and the tool will be driven by a left hand rotation, as seen looking downward. If the handle 30 be moved downward, the tool will be driven in the reverse direction.

It will be seen that my portable reduction gear has among others the following advantages. It is of such construction that it may be made water-and-dust-tight, as is highly desirable for a tool to be put in the hands of careless and ignorant workmen. The tool is readily portable and can be used to advantage to drive screw railroad spikes, and that is the purpose for which this particular embodiment is primarily intended, the shaft being preferably driven by a motor on a track car.

While the shaft 14 can rotate at a high rate of speed, as is desirable in driving it by an explosive engine on a motor car, the reduction in speed is such that the spike driver rotates at a very convenient speed for driving the screw spike.

The bevel gears being supported by the friction washers near their peripheries can be light and yet the amount of friction in supporting them can be small. The use of the sleeve 41 to hold the bevel gears in place, the said sleeve itself being positioned by engagement with the peripheries of the clutch members, is a very simple and efficient construction.

It is obvious that various changes can be made in the above illustrated embodiment of my invention, and I desire that my claims be not limited beyond the requirements of the prior art and their necessary intendment.

I claim:

1. In a tool driving machine, the combination of a casing, a shaft having bearing in said casing, a bevel pinion carried by said shaft, oppositely facing bevel gears engaging said pinion, a clutch member carried by each of said gears, a shaft co-axial with said bevel gears and supporting the same and having an intermediate clutch member tight thereon, a tool driving spindle connected with said clutch shaft, and means for shifting said latter shaft to throw the intermediate clutch member into engagement with either of said first-mentioned clutch members.

2. In a tool driving machine, the combination of a casing, a shaft having bearing in said casing, a pinion on said shaft, oppositely facing bevel gears engaging said pinion, each of said gears having a hub on the back thereof, said hubs having bearing in the casing, each of said gears having a clutch member formed on the face thereof, a shaft having bearing in said hubs, an intermediate clutch member on said shaft, a ring inclosing said clutch member and bearing against the inner faces of said gears to hold said gears apart, means for shifting said intermediate clutch member, a tool driving spindle, and connections between said spindle and said shaft.

3. In a tool driving machine, the combination of a casing, a shaft having bearing therein, a pinion on said shaft, oppositely facing bevel gears having hubs on the back thereof that have bearing in said casing, clutch members formed on the faces of said gears, a shaft having bearing in said hubs, an intermediate clutch member tight on said shaft, means for shifting said last-mentioned shaft and clutch member, anti-friction washers mounted in said casing and bearing on the back of said gears near the periphery thereof, a tool driving spindle, and connections between said shaft and said spindle.

4. In a tool driving machine, the combination of a casing, a shaft having bearing therein, a bevel pinion on said shaft, oppositely facing bevel gears meshing with said pinion, a shaft co-axial with said gears, clutch members by which said shaft may be engaged with either of said gears, a tool driving spindle co-axial with said gears and said shaft, a pinion keyed to said shaft, a pinion keyed to said spindle, a shaft parallel to said first-mentioned shaft and reduction gearing carried upon said last mentioned shaft and meshing with said pinions.

5. In a tool driving machine, the combination of a casing, a shaft having bearing therein, a bevel pinion on said shaft, oppositely facing bevel gears meshing with said pinion, a shaft co-axial with said gears, clutch members by which said shaft may be engaged with either of said gears, a tool driving spindle co-axial with said gears and said shaft, a pinion keyed to said shaft, a pinion keyed to said spindle, and reduction gearing conveying motion from the first to the second of said pinions.

6. In a tool driving machine, the combination of a casing, a shaft having bearing therein, a bevel pinion on said shaft, oppositely facing bevel gears meshing with said pinion, a shaft co-axial with said gears, clutch members by which said shaft may be engaged with either of said gears, a tool driving spindle co-axial with said gears and said shaft, a pinion keyed to said shaft, a pinion keyed to said spindle, a plurality of shafts parallel with said first-mentioned shaft, and reduction gearing carried by each of them for transmitting motion from the first to the second of said pinions.

7. In a machine for driving tools, the combination of a casing consisting of a top, a bottom and an intermediate web, oppositely facing bevel gears mounted in the casing between the top and the web, a shaft having bearing in the casing, a bevel pinion on said shaft meshing with both of said gears, a tool driving spindle having bearing in the bottom of said casing, a shaft co-axial with said bevel gears, and reduction gearing mounted between said web and the bottom of said casing for transmitting motion from said last-mentioned shaft to said spindle.

8. In a machine for driving tools, the combination of a casing comprising a top, a web and a bottom, oppositely facing bevel gears mounted between said shaft and said web, said gears each having a hub on the back thereof bearing in said casing, a shaft having bearing in said casing, a pinion on said shaft engaging said gears, a clutch member formed on the face of each of said gears, a shaft co-axial with said gears, an intermediate clutch member on said shaft, a ring inclosing said clutch members and bearing against the opposing faces of said gears to keep the latter separated, means for shifting said intermediate clutch member, a tool driving spindle having bearing in the bottom of said casing, and reduction gearing between said web and the bottom of said casing for communicating motion from said clutch shaft to said spindle.

9. In a machine for driving tools, the combination of a casing comprising a top, a bottom and an intermediate web, oppositely facing bevel gears mounted in the casing between the top and web, a bevel pinion meshing with said gears, a shaft carrying the said pinion, a shaft co-axial with said gears, means for clutching said shaft to either of said gears, a tool driving spindle co-axial with said gears, a pinion on said clutch shaft, a pinion on said spindle, shafts having bearing in said web and in the bottom of said casing, said last-mentioned shafts being parallel with said clutch shaft, and gears on said last-mentioned shafts meshing with each of said pinions.

10. In a tool driving machine, the combination of a casing, comprising a top, a web and a bottom, said top carrying a boss bevel gears mounted between said top and said web, each of said gears having a hub on the back thereof that has bearing in said casing, a bevel pinion meshing with said gears, a shaft carrying said pinion and having bearing in the casing, a shaft having bearing in said boss and in the hubs of said gears, a handle attached to said shaft and projecting through a slot in said boss, clutch members carried by said gears, an intermediate clutch member carried by said shaft, a tool driving spindle having bearing in the bottom of said casing, and reduction gearing connecting said clutch shaft with said spindle.

In testimony that I claim the foregoing I have hereunto set my hand.

HENRY W. JACOBS.

Witnesses:
M. L. RHOADES,
W. M. ALLISON, Jr.